W. L. BURTON.
Electro Heating Apparatus.
No. 88,006. Patented March 23, 1869.
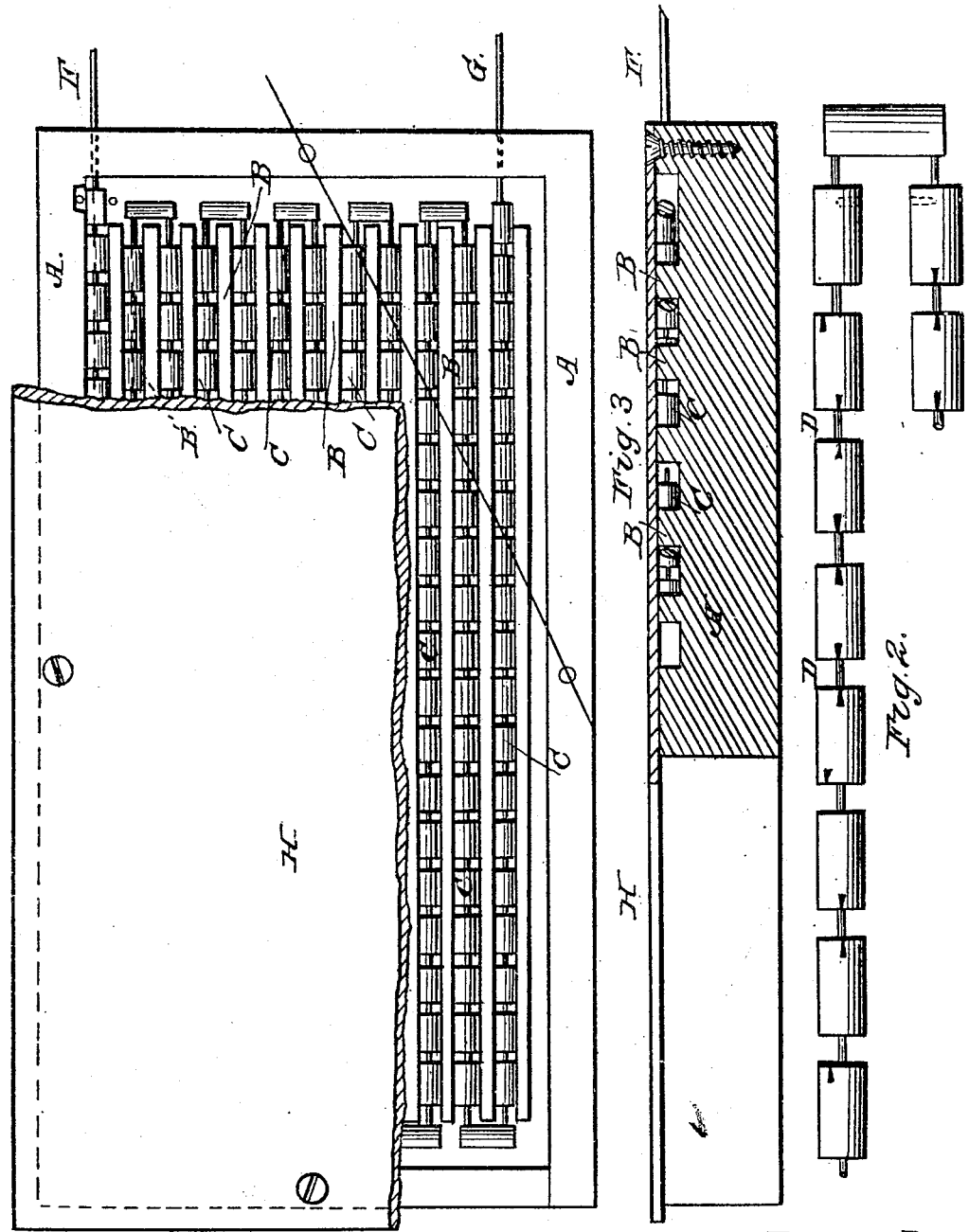

W. LEIGH BURTON, OF RICHMOND, VIRGINIA.

Letters Patent No. 88,006, dated March 23, 1869; antedated March 12, 1869.

IMPROVEMENT IN ELECTRO-HEATING APPARATUS.

The Schedule referred to in these Letters Patent and making part of the same

*To all whom it may concern:*

Be it known that I, W. LEIGH BURTON, of Richmond, in the county of Henrico, and State of Virginia, have invented certain new and useful Improvements in Evolving Heat from Electricity; and I do hereby declare that the following is a sufficiently full, clear, and exact description of my said invention, to enable one skilled in the art to which it appertains, to carry it into effect, reference being had to the accompanying drawings, which exhibit it in one of its applications, namely, for heating railway-carriages, by means of heated metallic plates placed under the feet of passengers.

My invention is based upon the well-known fact that electricity, in passing through a conductor of insufficient capacity, (such, for instance, as a wire of very small diameter,) evolves, or develops heat.

It is also well known that a wire of any great length, and of sufficiently small size to evolve considerable heat, will not conduct a strong current of electricity without difficulty and loss, and that as the wire becomes heated, its non-conductivity is increased, and that, in consequence, the heat becomes so great that the wire will be fused.

The object of my invention is to obviate this difficulty, by enabling a strong current of electricity to pass through a heat-evolving apparatus of any length; and to this end, My invention consists in providing an electrical conducting-coil, or chain, with intervals of small conducting-power, in traversing which the electricity will be caused to evolve heat; and further, in interposing between said obstructing-intervals, free conductors of much larger size, which constitute reservoirs of electricity, and radiators of heat, and will effectually obviate the difficulty experienced in a continuous length of conductor of insufficient capacity.

In the drawings—

Figure 1 is a plan of a device, or apparatus, by wnich my invention may be applied for heating railway-carriages, by means of heated metallic plates placed under the feet of passengers, portions of the plate being omitted, in order to expose the interior.

Figure 2 is a plan, on a larger scale, of a portion of my conducting and heat-evolving coil, or chain.

Figure 3 represents a vertical transverse section of the apparatus.

In this application of my invention, A, fig. 1, may represent a bed, or case, of any suitable non-conducting material. It is divided into parallel longitudinal grooves, of a sufficient size and depth to contain the coil, or chain, and close enough together to allow of a compact arrangement of it.

B B represents the space, or division between the coil, and

C, the coil, resting in the bed, or groove.

F G represent wires, to be connected with the poles of an electrical machine, battery, or generator, furnishing, or producing a current of electricity best suited for the purpose of evolving heat; and H is a metallic plate, covering the coil C D, without contact therewith.

If the wires F G be placed in connection with any suitable electrical apparatus, the current of electricity, in passing the small intervals D, fig. 2, will evolve heat, but, by reason of the shortness of these, and the reservoirs provided by the interposed metal C, I am enabled to extend the coil, or chain to any length, in order that a large and compact arrangement may be obtained, to afford the required accumulation of heat. As soon as the obstructions D become heated, the heat is rapidly communicated to the reservoirs and radiators C, and from these to the metallic plate H.

I have used copper as a suitable substance for the reservoirs and radiators, on account of its conductivity for heat and electricity, and platinum for the obstructing intervals, on account of its comparatively low conductivity, and of its being able to withstand a high temperature without melting or oxidation. But I do not restrict myself to these, or any specific materials in the construction of my chain, or coil, nor do I restrict myself to any of the details of construction. I reserve the right, in carrying out my invention, to use a continuous obstructing-medium, and attach reservoirs, or radiators of any shape or size to it; or to use short pieces of the obstructing material, and connect them with the reservoirs in any manner whatever; or to use the same metal, and reduce the size of it at intervals, for the purpose of producing obstructing-media, either by pressure, hammering, or casting, or in any other manner whatever.

It is intended to use the invention for producing heat in all cases where it can be applied to advantage, and to use the kind of electricity and electrical apparatus that may be found best adapted for the purpose.

Having thus described my invention, the following is what I claim as new, and desire to secure by Letters Patent:

Evolving and accumulating heat from electricity, by means of a chain, or coil, made up of an alternate succession of reservoirs and obstructions, assembled and arranged in a compact space within a suitable casing, substantially as set forth.

Witnesses:  W. LEIGH BURTON.
WM. COULLING,
E. W. SKELTON.